(12) United States Patent
Lin et al.

(10) Patent No.: US 11,346,479 B2
(45) Date of Patent: May 31, 2022

(54) PIPE FITTING JOINT ASSEMBLY

(71) Applicants: RIFENG ENTERPRISE (FOSHAN) CO., LTD., Guangdong (CN); RIFENG ENTERPRISE GROUP CO., LTD., Guangdong (CN); RIFENG TECHNOLOGY CO., LTD., Guangdong (CN)

(72) Inventors: Xiyong Lin, Foshan (CN); Jiajia Cheng, Foshan (CN); Zhenbin Diao, Foshan (CN); Xin Li, Foshan (CN); Huijian Cao, Foshan (CN); Wenfeng Chen, Foshan (CN); Jianbo Liao, Foshan (CN); Ximin Li, Foshan (CN); Ali Chen, Foshan (CN)

(73) Assignees: RIFENG ENTERPRISE (FOSHAN) CO., LTD., Guangdong (CN); RIFENG ENTERPRISE GROUP CO., LTD., Guangdong (CN); RIFENG TECHNOLOGY CO., LTD., Guangdong (CN)

( * ) Notice: Subject to any disclaimer, the term of this patent is extended or adjusted under 35 U.S.C. 154(b) by 251 days.

(21) Appl. No.: 16/612,668

(22) PCT Filed: Dec. 29, 2018

(86) PCT No.: PCT/CN2018/125613
§ 371 (c)(1),
(2) Date: Nov. 11, 2019

(87) PCT Pub. No.: WO2019/149014
PCT Pub. Date: Aug. 8, 2019

(65) Prior Publication Data
US 2020/0096145 A1    Mar. 26, 2020

(30) Foreign Application Priority Data

Feb. 1, 2018  (CN) .......................... 201810102123.4
Jul. 23, 2018  (CN) .......................... 201821172431.6

(51) Int. Cl.
*F16L 37/091*    (2006.01)

(52) U.S. Cl.
CPC ......... *F16L 37/091* (2013.01); *F16L 2201/10* (2013.01)

(58) Field of Classification Search
CPC ....... F16L 19/08; F16L 19/083; F16L 19/086; F16L 33/00; F16L 33/20; F16L 37/091;
(Continued)

(56) References Cited

U.S. PATENT DOCUMENTS 3,408,099 A * 10/1968 Appleton .............. F16L 33/223
285/247
3,984,133 A    10/1976 Bird
(Continued)

FOREIGN PATENT DOCUMENTS

CN    104154363 A    11/2014
CN    203924271 U    11/2014
(Continued)

OTHER PUBLICATIONS

Office Action for European Application No. 18904457.1 dated May 19, 2020, 2 pages.
(Continued)

*Primary Examiner* — Aaron M Dunwoody
(74) *Attorney, Agent, or Firm* — Seyfarth Shaw LLP

(57) ABSTRACT

A pipe fitting joint assembly including a guide sleeve, provided with a first concave-convex structure on the outer wall of one end thereof, a connecting body, provided with a second concave-convex structure on the inner walls of both
(Continued)

ends thereof, and an inner gear ring provided with a third concave-convex structure on an inner ring thereof and a fourth concave-convex structure on an outer ring thereof. The inner gear ring is concentrically inserted into the connecting body. The fourth concave-convex structure and the second concave-convex structure are in interference fit. The guide sleeve is concentrically inserted into the inner ring gear of the connecting body. The first concave-convex structure and the fourth concave-convex structure are in clearance fit therebetween using a moving interference manner.

20 Claims, 8 Drawing Sheets

(58) Field of Classification Search
CPC ............... F16L 37/0915; F16L 37/0926; F16L 37/0925; F16L 2201/10
USPC .................... 285/39, 239, 242, 259, 340, 93
See application file for complete search history.

(56) References Cited

U.S. PATENT DOCUMENTS

| | | | | |
|---|---|---|---|---|
| 5,775,742 A | * | 7/1998 | Guest | .................. F16L 37/0925 285/322 |
| 5,853,202 A | | 12/1998 | Li et al. | |
| 6,086,044 A | * | 7/2000 | Guest | .................. F16L 37/0925 251/148 |
| 7,063,359 B2 | * | 6/2006 | Vallee | .................. F16L 37/0915 285/3 |
| 2007/0267869 A1 | | 11/2007 | Patel | |
| 2010/0032943 A1 | | 2/2010 | Li et al. | |
| 2013/0257036 A1 | * | 10/2013 | Guest | .................. F16L 37/0927 285/93 |
| 2015/0345683 A1 | | 12/2015 | Crompton et al. | |

FOREIGN PATENT DOCUMENTS

| | | |
|---|---|---|
| CN | 203940141 U | 11/2014 |
| CN | 204647647 U | 9/2015 |
| CN | 105221878 A | 1/2016 |
| GB | 438250 A | 11/1935 |
| JP | 2002372183 A | 12/2002 |
| KR | 20090069120 A | 6/2009 |
| WO | 2006031386 A2 | 3/2006 |
| WO | 2006037962 A1 | 4/2006 |

OTHER PUBLICATIONS

European Search Report for Application No. EP18904457.1 dated Sep. 11, 2020, 8 pages.
Office Action for Australian Application No. 2018406678 dated Sep. 16, 2020, 10 pages.
International Search Report for Application No. PCT/CN2018/125613 dated Mar. 21, 2019, 4 pages.
Written Opinion for Application No. PCT/CN2018/125613 dated Mar. 21, 2019, 3 pages.
Examination Report No. 2 for corresponding Australian Application No. 2018406678 dated Feb. 15, 2021, 7 pages.

* cited by examiner

PIPE FITTING JOINT ASSEMBLY

CROSS REFERENCE TO RELATED APPLICATIONS

This is a U.S. National Stage application of, and claims priority to, PCT/CN2018/125613, filed Dec. 29, 2018, which further claims priority to Chinese Patent Application No. 201810102123.4, filed Feb. 1, 2018 and Chinese Patent Application No. 201821172431.6, filed Jul. 23, 2018, the disclosures of which are incorporated herein by reference in their entirety.

TECHNICAL FIELD

The present disclosure relates to pipe stock connectors, and more particularly to a pipe joint assembly.

BACKGROUND

How to achieve rapid mounting between pipe stocks has become an important issue for technicians in the pipe fitting industry. When the pipe stocks are connected through the pipe stock connector, the insertion depth is a criterion for ensuring that the mounting is in position, and is also an important factor for ensuring good sealing during the use of the pipes. Accordingly, in a process of pipe stock connection, generally, a peephole is provided on the pipe stock connector, or a scale mark is provided on a surface of the pipe stock, or a material having a transparent effect is adopted to facilitate observation and determination of the mounting of the pipe and the pipe stock. However, the aforementioned methods are complicated in processing, have certain restrictions on materials, and do not have market competitiveness.

SUMMARY

Accordingly, it is necessary to provide a pipe joint assembly, which can conveniently and quickly determine whether the mounting between the pipe stock and the pipe is in position, and has a simple and quick manufacturing process, no special requirement on materials, and strong market competitiveness.

The technical solutions are as follows:

According to one aspect of the present disclosure, a pipe joint assembly is provided, including a connecting body and a guiding sleeve. One end of the guiding sleeve is adapted to receive a pipe stock, and an outer wall of the other end of the guiding sleeve is provided with a first concave-convex structure. Both ends of the connecting body are adapted to receive the guiding sleeve, and an inner wall of the connecting body is provided with a second concave-convex structure matching with the first concave-convex structure. The first concave-convex structure is in an interference fit with the second concave-convex structure when the pipe stock sleeved on the guiding sleeve is inserted in position, and the first concave-convex structure and the second concave-convex structure generate a frictional sound when the guiding sleeve rotates relative to the connecting body.

The pipe joint assembly provided above is mainly provided with a first concave-convex structure on the outer wall of the guiding sleeve and a second concave-convex structure on the inner wall of the connecting body, so that whether the pipe stock sleeved on the guiding sleeve is mounted in position can be determined by the generated frictional sound. Specifically, during use, one end of the guiding sleeve is first inserted into the pipe stock to be connected, so that the pipe stock is fixed relative to the guiding sleeve, and then the guiding sleeve sleeved with the pipe stock is inserted into the connecting body. When the pipe stock is mounted in position, the first concave-convex structure is in matched contact with the second concave-convex structure to achieve an interference fit. In addition, when the guiding sleeve rotates relative to the connecting body, based on the interference fit between the first concave-convex structure and the second concave-convex structure, a frictional sound is generated, thereby providing an indication that the pipe stock is mounted in position. By adopting the aforementioned pipe joint assembly, whether the pipe stock is mounted in position can be conveniently and quickly determined during use, and the pipe joint assembly does not require multiple complicated processing processes, the manufacturing process is not limited by materials, and the pipe joint assembly has strong market competitiveness.

Further, the first concave-convex structure includes a pointed paddle, and the second concave-convex structure includes wavy tines distributed circumferentially along the inner wall of the connecting body.

Further, there are a plurality of pointed paddles, and each of the pointed paddles is circumferentially spaced apart at the outer wall of the guiding sleeve.

Further, an end of a cannula of the connecting body is axially distributed with a plurality of second concave-convex structures, and the second convex-concave structure is directly disposed on the connecting body or fixed on the connecting body in an inlaid manner.

Further, the pipe joint assembly further includes a first sealing ring and a sealing loop. The outer wall of the guiding sleeve is provided with a first groove and a second groove, and the second groove is located between the first groove and the first concave-convex structure. The first sealing ring is matched with the second groove to achieve a seal between the outer wall of the guiding sleeve and the inner wall of the connecting body. The sealing loop is a rubber loop overmolded in the first groove to achieve a seal between an inner wall of the pipe stock and the outer wall of the guiding sleeve.

Further, the first groove is provided with anti-slip ribs at a bottom wall thereof, and the anti-slip ribs are ribs axially distributed along the guiding sleeve.

Further, the guiding sleeve is provided with an inclined protrusion at the outer wall thereof. The first groove is located between the second groove and the inclined protrusion. A thickness of the inclined protrusion gradually decreases along a direction away from the first concave-convex structure, and an inner wall of the pipe stock sleeved on the guiding sleeve is capable of being pressed against the inclined protrusion.

Further, the pipe joint assembly further includes a second sealing ring. The inner wall of the connecting body is provided with a mounting position configured to position the second sealing ring, and the second sealing ring is capable of being pressed between the connecting body and the pipe stock.

Further, the pipe joint assembly further includes a cushion, an internal teeth washer, and a housing sleeved on the outer wall of the connecting body. The cushion and the internal teeth washer are sequentially laminated on an end portion of the connecting body. The connecting body is provided with a flange at the outer wall thereof. The housing is provided with a fastening groove at an inner wall thereof. One side wall of the fastening groove is pressed against the internal teeth washer, and the other side wall thereof is hooked on the flange. Teeth of the internal teeth washer is capable of being pressed against an outer wall of the pipe stock.

Further, the pipe joint assembly further includes a pressing sleeve and a pipe acquiring pressing member. The pressing sleeve is inserted into the housing. The pressing sleeve is hooked on the inner wall of the housing, and a front end portion of the pressing sleeve is capable of abutting against the teeth of the internal teeth washer. The pipe acquiring pressing member includes an elastic bending portion and pressing portions located at both ends of the elastic bending portion. The elastic bending portion is provided with a bump at a side wall thereof. The pipe acquiring pressing member is pressed in a direction proximal to the pressing sleeve by controlling the pressing portion, so that the bump presses upwardly a rear end portion of the pressing sleeve, and the front end portion of the pressing sleeve is moved to open the teeth of the internal teeth washer.

According to another aspect of the present disclosure, a pipe joint assembly is further provided, including: a guiding sleeve, one end of the guiding sleeve is insertable into a pipe stock, and an outer wall of the other end of the guiding sleeve is provided with a first concave-convex structure; a connecting body, an inner wall of both ends of the connecting body is provided with a second concave-convex structure; an inner ring gear, an inner ring of the inner ring gear is provided with a third concave-convex structure, and an outer ring of the inner ring gear is provided with a fourth concave-convex structure. Both ends of the connecting body are adapted to receive the guiding sleeve and the inner ring gear. The inner ring gear is concentrically inserted into the connecting body. The fourth concave-convex structure is in an interference fit with the second concave-convex structure. The guiding sleeve is simultaneously concentrically inserted into the connecting body and the inner ring gear. The first concave-convex structure is in clearance fit with the fourth concave-convex structure in a manner of movement interference. When the guiding sleeve rotates relative to the inner ring gear, the first concave-convex structure and the third concave-convex structure generate a frictional sound and a vibration.

Further, the first concave-convex structure includes a pointed paddle, the second concave-convex structure includes wavy tines distributed circumferentially along the inner wall of the connecting body, the third convex structure includes wavy tines distributed circumferentially along the inner wall of the connecting body, and the fourth concave-convex structure includes a ridge.

Further, there are a plurality of pointed paddles, and each of the pointed paddles is circumferentially spaced apart at the outer wall of the guiding sleeve.

Further, there are a plurality of ridges, each of the ridges is circumferentially spaced apart at the outer ring of the inner ring gear and corresponds to a gap of the wavy tines on the inner ring of the inner ring gear.

Further, an end of a cannula of the connecting body is axially distributed with a plurality of second concave-convex structures, and the second convex-concave structure is directly disposed on the connecting body or fixed on the connecting body in an inlaid manner.

Further, the pipe joint assembly further includes a first sealing ring and a sealing loop. The outer wall of the guiding sleeve is provided with a first groove and a second groove, and the second groove is located between the first groove and the first concave-convex structure. The first sealing ring is matched with the second groove to achieve a seal between the outer wall of the guiding sleeve and the inner wall of the connecting body. The sealing loop is a rubber loop overmolded in the first groove to achieve a seal between an inner wall of the pipe stock and the outer wall of the guiding sleeve.

Further, the first groove is provided with anti-slip ribs at a bottom wall thereof, and the anti-slip ribs are ribs axially distributed along the guiding sleeve.

Further, the guiding sleeve is provided with an inclined protrusion at the outer wall thereof. The first groove is located between the second groove and the inclined protrusion. A thickness of the inclined protrusion gradually decreases along a direction away from the first concave-convex structure, and an inner wall of the pipe stock sleeved on the guiding sleeve is capable of being pressed against the inclined protrusion.

Further, the pipe joint assembly further includes a second sealing ring. The inner wall of the connecting body is provided with a mounting position configured to position the second sealing ring, and the second sealing ring is capable of being pressed between the connecting body and the pipe stock.

Further, the pipe joint assembly further includes a cushion, an internal teeth washer, and a housing sleeved on the outer wall of the connecting body. The cushion and the internal teeth washer are sequentially laminated on an end portion of the connecting body. The connecting body is provided with a flange at the outer wall thereof. The housing is provided with a fastening groove at an inner wall thereof. One side wall of the fastening groove is pressed against the internal teeth washer, and the other side wall thereof is hooked on the flange. Teeth of the internal teeth washer is capable of being pressed against an outer wall of the pipe stock.

Further, the pipe joint assembly further includes a pressing sleeve and a pipe acquiring pressing member. The pressing sleeve is inserted into the housing. The pressing sleeve is hooked on the inner wall of the housing, and a front end portion of the pressing sleeve is capable of abutting against the teeth of the internal teeth washer. The pipe acquiring pressing member includes an elastic bending portion and pressing portions located at both ends of the elastic bending portion. The elastic bending portion is provided with a bump at a side wall thereof. The pipe acquiring pressing member is pressed in a direction proximal to the pressing sleeve by controlling the pressing portion, so that the bump presses upwardly a rear end portion of the pressing sleeve, and the front end portion of the pressing sleeve is moved to open the teeth of the internal teeth washer.

Figure 1:
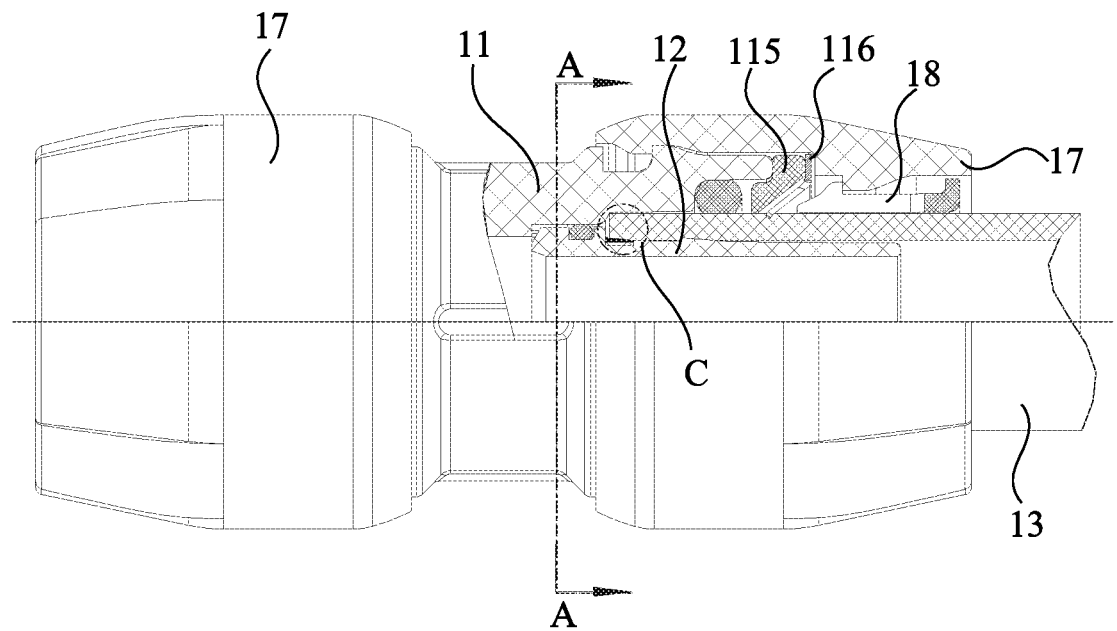
FIG. 1 is a schematic view of a pipe joint assembly according to an embodiment.

DESCRIPTION OF REFERENCE NUMERALS 10, pipe joint assembly; 11, connecting body; 111, second concave-convex structure; 112, first boss; 113, mounting position; 114, flange; 115, cushion; 116, internal teeth washer; 1161, teeth; 12, guiding sleeve; 121, first concave-convex structure; 122, chamfer; 123, first groove; 124, second groove; 125, anti-slip rib; 126, inclined protrusion; 13, pipe stock; 14, first sealing ring; 15, sealing loop; 16, second sealing ring; 17, housing; 171, fastening groove; 18, pressing sleeve; 181, front end portion; 182, rear end portion; 19, pipe acquiring pressing member; 191, elastic bending portion; 192, pressing portion; 193, bump; 20, pipe joint assembly; 21, connecting body; 22, guiding sleeve; 23, inner ring gear; and 24, pipe stock.

DETAILED DESCRIPTION OF THE EMBODIMENTS

In order to facilitate the understanding of the present disclosure, the present disclosure will be described more fully hereinafter with reference to the related accompanying drawings. Preferable examples of the present disclosure are presented in the drawings. However, the present disclosure may be embodied in many different forms and is not limited to the examples described herein. Rather, these examples are provided so that the understanding of the present disclosure will be more thorough and complete.

It will be understood that when an element is referred to as being "fixed" to another element, it can be directly fixed on the other element or intervening elements may be present. When an element is referred to as being "connected" or "coupled" to another element, it can be directly connected or coupled to the other element or intervening elements may be present. In contrast, if an element is referred to as being "directly fixed" to another element, there are no intervening elements present. The terms used herein "vertical", "horizontal", "left", "right", and the like are for illustrative purposes only and are not intended to be the only example.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein. The term "and/or" used herein includes any and all combinations of one or more of the associated listed items.

Figure 11:
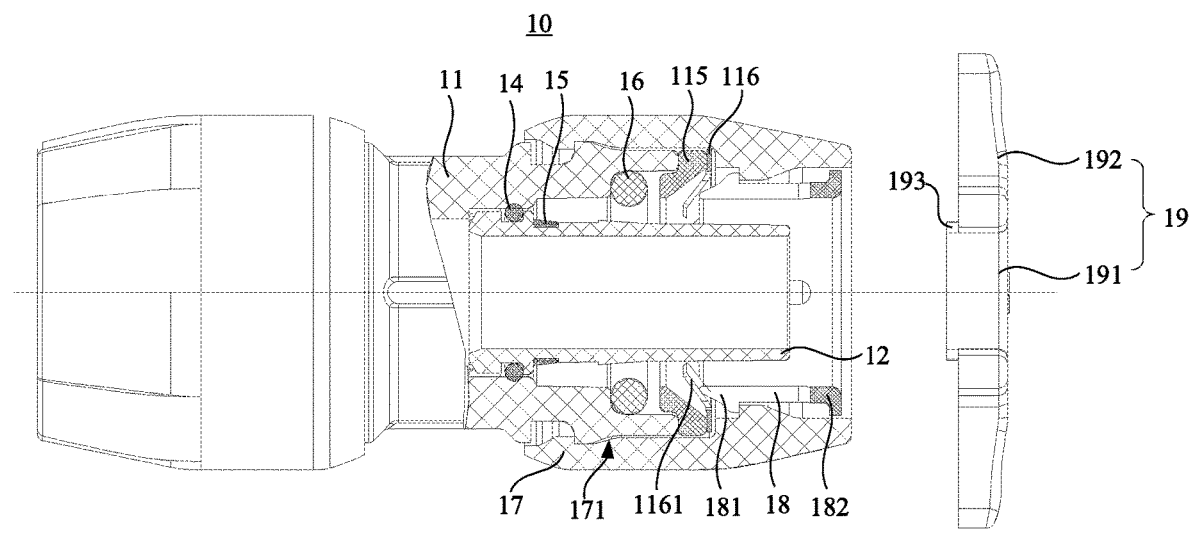
FIG. 11 is another schematic view of the pipe joint assembly according to the embodiment.

Referring to FIG. 1 and FIG. 11, a pipe joint assembly 10 is provided according to an embodiment, which includes a connecting body 11 and a guiding sleeve 12. One end of the guiding sleeve 12 can be inserted into the pipe stock 13, and an outer wall of the other end of the guiding sleeve 12 is provided with a first concave-convex structure 121. Both ends of the connecting body 11 can receive the guiding sleeve 12, and an inner wall of the connecting body 11 is provided with a second concave-convex structure 111 matching with the first concave-convex structure 121. When the pipe stock 13 sleeved on the guiding sleeve 12 is inserted in position, the first concave-convex structure 121 is in an interference fit with the second concave-convex structure 111. In addition, when the guiding sleeve 12 rotates relative to the connecting body 11, the first concave-convex structure 121 and the second concave-convex structure 111 generate a frictional sound.

In the pipe joint assembly 10 provided above, it is determined whether the pipe stock 13 is mounted in position by the cooperation of the first concave-convex structure 121 and the second concave-convex structure 111, and no additional process is required to manufacture the pipe joint assembly 10, and no special requirement is required for material selection, thus the pipe joint assembly 10 has strong market competitiveness. Specifically, in daily life, the connection between the pipes is achieved by a pipe joint, and the pipe joint assembly 10 provided above includes the connecting body 11 and the guiding sleeve 12, and both ends of the connecting body 11 can receive the guiding sleeve 12. During use, the pipe stock 13 is first sleeved onto the guiding sleeve 12, and then the guiding sleeve 12 to which the pipe stock 13 is attached is inserted into the connecting body 11. When the pipe stock 13 is inserted in position, referring to FIG. 2 and FIG. 3, the second concave-convex structure 111 on the inner wall of the connecting body 11 is in interference fit with the first concave-convex structure 121 on the outer wall of the guiding sleeve 12. In addition, when the connecting body 11 and the guiding sleeve 12 rotate relatively, the first concave-convex structure 121 and the second concave-convex structure 111 generate the frictional sound, thereby indicating that the pipe stock 13 is mounted in position. With such a configuration, complicated processes such as additional punching on the pipe joint assembly 10 are avoided, and the provision of corresponding concave-convex structures on the connecting body 11 and the guiding sleeve 12 also has no special requirement on the material of the pipe joint assembly 10, so that the market competitiveness of the pipe joint assembly 10 is improved as a whole.

In addition, the aforementioned mounting of the pipe stock 13 in position means that the depth of insertion of the pipe stock 13 into the connecting body 11 conforms to the mounting requirements. Specifically, it may be whether the pipe stock 13 has a sufficient length to overlap the connecting body 11, or it may be whether the depth of the insertion of the pipe stock 13 satisfies other requirements such as sealing.

The pipe joint assembly 10 provided above mainly utilizes the interference fit between the first concave-convex structure 121 and the second concave-convex structure 111, and when the connecting body 11 and the guiding sleeve 12 rotate relatively, the first concave-convex structure 121 and the second concave-convex structure 111 that are in interference fit generate the frictional sound. It can be determined whether the pipe stock 13 is mounted in position by listening to whether there is the frictional sound. Therefore, as long as the first concave-convex structure 121 and the second concave-convex structure 111 generate the frictional sound when the connecting body 11 and the guiding sleeve 12 rotate relatively, there is no excessive requirement for the specific shape and arrangement position of the first concave-convex structure 121 and the second concave-convex structure 111. For example, the first concave-convex structure 121 and the second concave-convex structure 111 may each be wavy tines distributed at corresponding positions. Alternatively, the first concave-convex structure 121 may be a plurality of protrusions spaced apart at the outer wall of the guiding sleeve 12, and the second concave-convex structure 111 may be a plurality of protrusions spaced apart at the inner wall of the connecting body 11. As long as the plurality of protrusions on the outer wall of the guiding sleeve 12 and the plurality of protrusions on the inner wall of the connecting body 11 are genereate frictional sound when the connecting body 11 rotates relative to the guiding sleeve 12.

Figure 2:
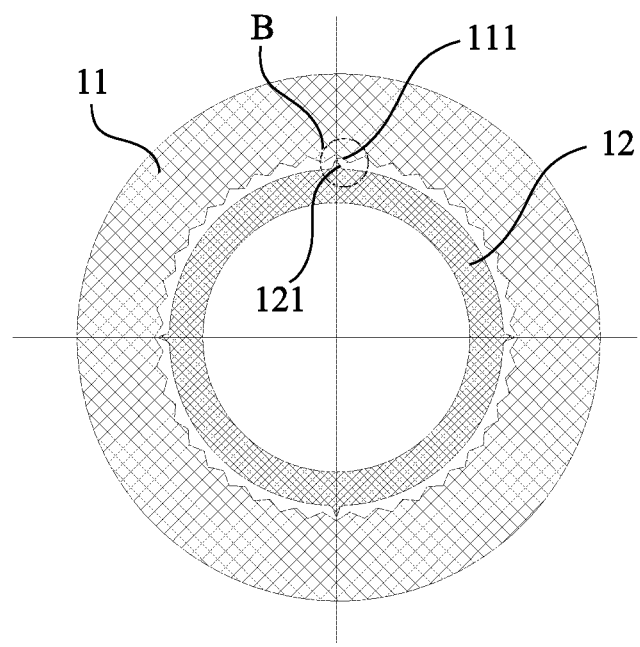
FIG. 2 is a cross-sectional view of FIG. 1 taken along a direction of A-A with a housing omitted.
Figure 3:
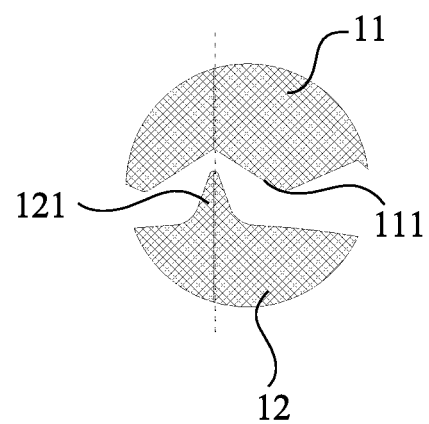
FIG. 3 is a partial enlarged view of a position B in FIG. 2.
Figure 5:
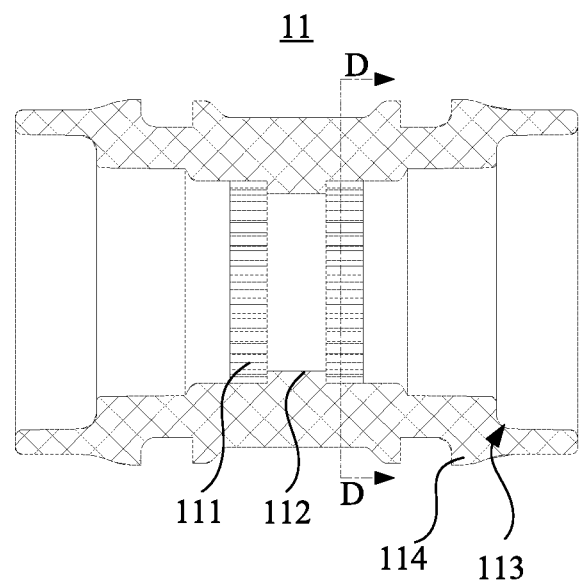
FIG. 5 is a schematic view of a connecting body according to the embodiment.
Figure 6:
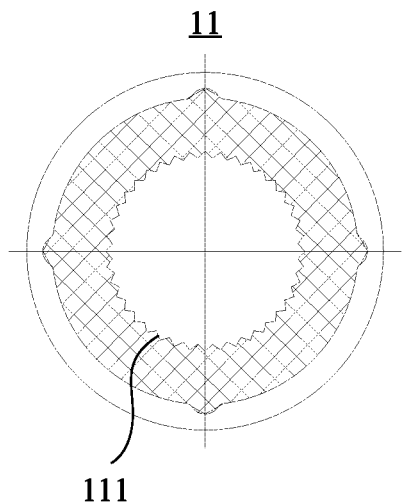
FIG. 6 is a cross-sectional view of FIG. 5 taken along a direction of D-D.
Figure 9:
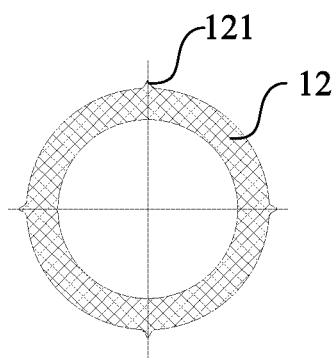
FIG. 9 is a cross-sectional view of FIG. 8 taken along a direction of E-E.

Alternatively, specifically, in one embodiment, referring to FIG. 9, the first concave-convex structure 121 includes a pointed paddle, and referring to FIG. 5 and FIG. 6, the second concave-convex structure 111 includes wavy tines distributed circumferentially along the inner wall of the connecting body 11. The pointed paddles are in interference fit with the wavy tines when the pipe stock 13 is mounted in position during use, and the pointed paddles and the wavy tines generate the frictional sound when the connecting body 11 and the guiding sleeve 12 rotate relatively. Specifically, the number of the pointed paddles is not specifically required. For example, the number of the pointed paddles may be one or more, as long as the frictional sound can be generated. In addition, in one embodiment, there are a plurality of pointed paddles, and each of the pointed paddles is axially spaced apart at the outer wall of the guiding sleeve 12. By providing the plurality of pointed paddles to scrape against the wavy tines, the generated frictional sound is more pronounced. Specifically, referring to FIG. 9, there are four pointed paddles spaced apart at the outer wall of the guiding sleeve 12. Referring to FIG. 1 and FIG. 2, when the pipe stock 13 is mounted in position, the pointed paddles scrape against the wavy tines when the connecting body 11 and the guiding sleeve 12 rotate relatively, and a clicking sound will be generated.

Figure 7:
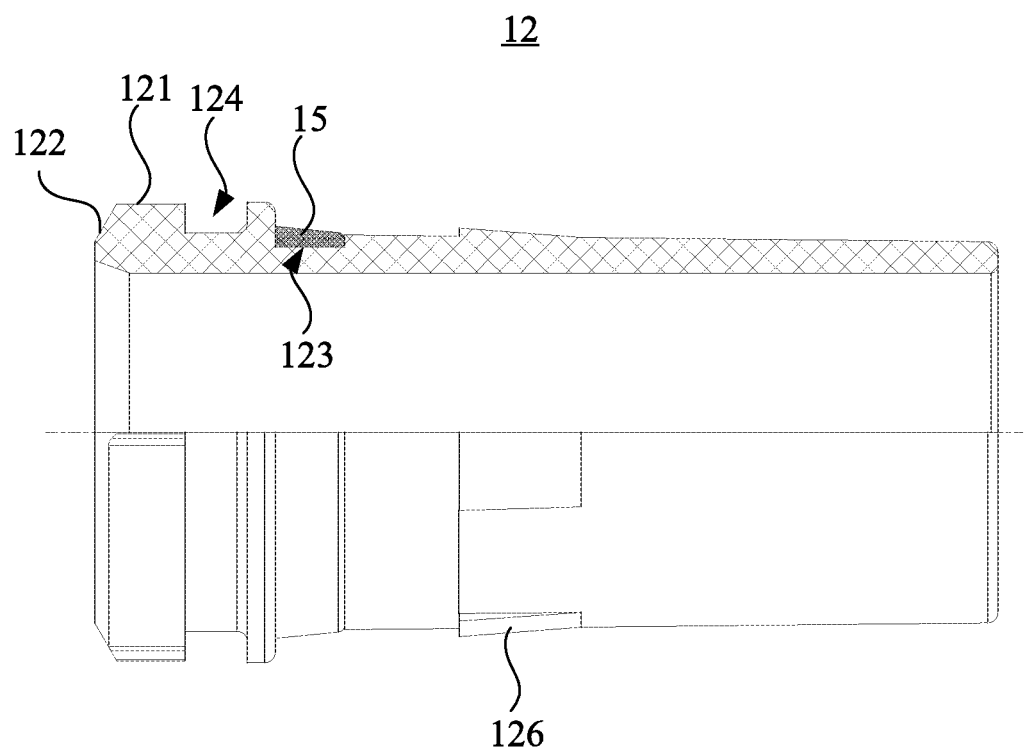
FIG. 7 is a schematic view of a guiding sleeve according to the embodiment.
Figure 8:
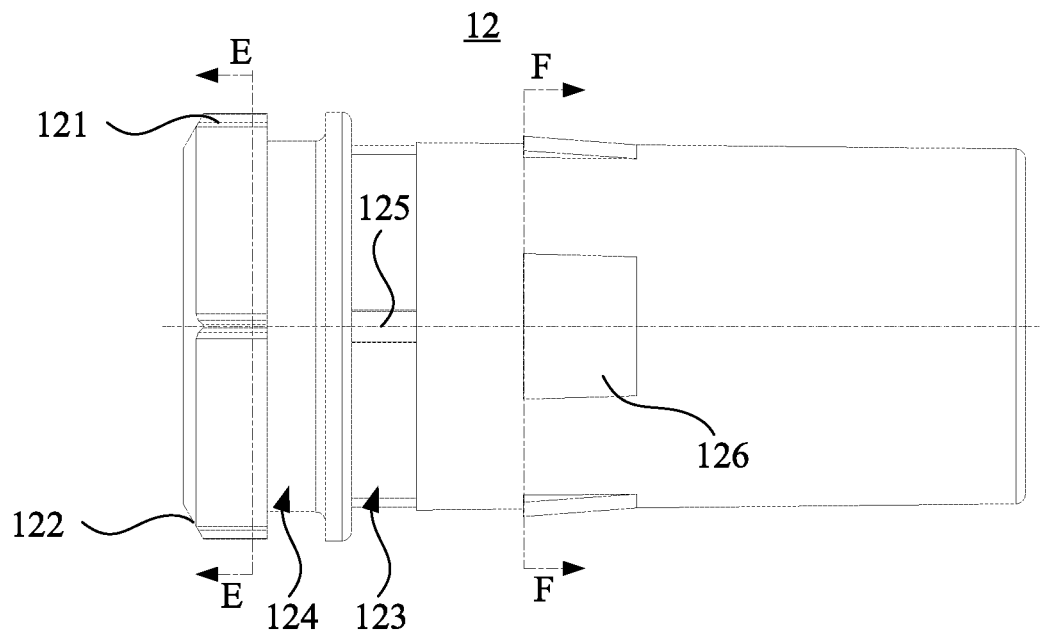
FIG. 8 is another schematic view of the guiding sleeve according to the embodiment.

In addition, in the aforementioned pipe joint assembly 10, both ends of the connecting body 11 can receive the guiding sleeve 12, and specifically, a second concave-convex structure 111 having a sufficient width can be provided to cooperate with the first concave-convex structure 121 of the guiding sleeve 12 inserted from both ends of the connecting body 11. Alternatively, in one embodiment, referring to FIG. 5, two second concave-convex structures 111 are axially distributed in a middle portion of the connecting body 11, and a first boss 112 is disposed between the two second concave-convex structures 111. Referring to FIG. 7 and FIG. 8, an end portion of the guiding sleeve 12 provided with the first concave-convex structure 121 is provided with a chamfer 122. During use, the first concave-convex structures 121 of the guiding sleeves 12 inserted from both ends of the connecting body 11 are cooperated with the respective second concave-convex structures 111, respectively, to achieve the determination of whether the pipe stock 13 is mounted in position. By providing the two second concave-convex structures 111 in this way and providing the first boss 112 between the two second concave-convex structures 111, the mutual influence between the guiding sleeves 12 inserted from both ends of the connecting body 11 can be effectively prevented. In addition, in order to further improve the cooperation performance of the guiding sleeve 12 and the connecting body 11, the end portion of the guiding sleeve 12 where the first concave-convex structure 121 is provided is provided with the chamfer 122, and the first concave-convex structure 121 can be more conveniently inserted into the second concave-convex structure 111 during the mounting process to achieve the interference fit between the two. Moreover, by providing the two second concave-convex structures 111 in the middle portion of the connecting body 11, the connecting body 11 has better rigidity while achieving the connection conduction effect, and the use reliability of the pipe joint assembly 10 is improved.

Moreover, specifically, referring to FIG. 5, in one embodiment, the middle portion of the connecting body 11 is axially provided with two wavy tines, and the first boss 112 is provided between the wavy tines. With such a configuration, the first concave-convex structures 121 of the guiding sleeves 12 inserted from both ends of the connecting body 11 are cooperated with the wavy tines at the corresponding sides, respectively. During use, the first concave-convex structure 121 is scraped on the wavy tines by rotating the pipe stock 13 or the connecting body 11, and the frictional sound is emitted, thereby determining that the pipe stock 13 is mounted in position. In addition, due to the influence of factors such as the error of the size of the pipe stock 13, there is a certain variation in the depth at which the pipe stock 13 is inserted into the connecting body 11 to reach the mounting standard. By designing the wavy tines, the wavy tines have a certain effective width and can effectively avoid the situation that it is impossible to determine whether the pipe stock 13 is mounted in position within a normal error range.

Furthermore, referring to FIG. 1 and FIG. 11, a first sealing ring 14 and a sealing loop 15 are further provided in the pipe joint assembly 10. The outer wall of the guiding sleeve 12 is provided with a first groove 123 and a second groove 124, and the second groove 124 is located between the first groove 123 and the first concave-convex structure 121. The first sealing ring 14 is matched with the second groove 124 to achieve a seal between the outer wall of the guiding sleeve 12 and the inner wall of the connecting body 11. The sealing loop 15 is a rubber loop overmolded in the first groove 123 to achieve a seal between the inner wall of the pipe stock 13 and the outer wall of the guiding sleeve 12.

Figure 4:
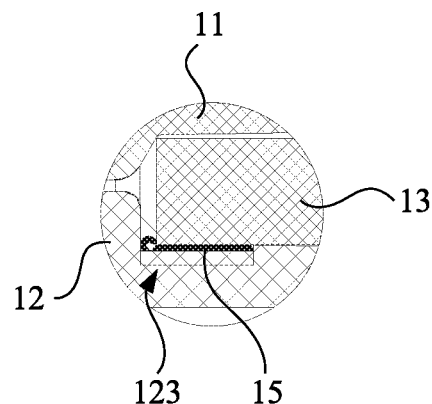
FIG. 4 is a partial enlarged view of a position C in FIG. 1.

The first groove 123 is disposed on the outer wall of the guiding sleeve 12, and the overmolded rubber loop is disposed in the first groove 123. During use, when the pipe stock 13 is sleeved on the guiding sleeve 12, referring to FIG. 4, the end portion of the pipe stock 13 is pressed against the rubber loop, so that the liquid flowing into the guiding sleeve 12 from the pipe stock 13 is effectively prevented from overflowing between the pipe stock 13 and the guiding sleeve 12, thereby achieving the seal of the connecting assembly of the pipe stock 13 in this direction. By providing the second groove 124 on the outer wall of the guiding sleeve 12, and providing the first sealing ring 14 between the second groove 124 and the inner wall of the connecting body 11, the seal between the outer wall of the guiding sleeve 12 and the inner wall of the connecting body 11 is achieved, and the liquid flowing from the middle portion of the connecting body 11 into the pipe stock 13 is prevented from flowing out from a gap between the connecting body 11 and the guiding sleeve 12, thereby achieving the seal of the connecting assembly of the pipe stock 13 in the other direction. By adopting the aforementioned structure, the double seal of the connecting assembly of the pipe stock 13 is achieved, the risk of liquid leakage is reduced, and the use performance of the pipe joint assembly 10 is improved.

Based on the fact that the sealing loop 15 is required to be pressed against the end portion of the pipe stock 13 when the pipe stock 13 is sleeved onto the guiding sleeve 12 during use, the sealing effect of a common O-shaped washer is poor due to the particularity of the sealing position of the sealing ring 15. When the groove for mounting the O-shaped washer is shallow, the O-shaped washer is easy to be pushed out of the groove. Therefore, in order to meet the use requirements, the depth of the groove for mounting the O-shaped washer needs to be set larger, and an inner diameter of the guiding sleeve 12 will be made small in order to meet the requirements of groove depth. Referring to FIG. 7, in the aforementioned structural design, the sealing loop 15 achieves the seal between the pipe stock 13 and the guiding sleeve 12 by adopting the rubber loop which is overmolded in the first groove 123. Based on the characteristics of strong engagement and thin wall of the rubber loop, the guiding sleeve 12 does not reduce the inner diameter size due to the need to provide the first groove 123 in which the rubber loop is placed, while achieving the aforementioned double seal. In addition, by using the overmolded rubber loop, when the pipe stock 13 is sleeved, it can effectively avoid the occurrence of the sealing failure and water leakage caused by the deviation of the washer from the corresponding groove when the O-shaped washer is used, thereby improving the sealing reliability of the pipe joint assembly 10.

In addition, in order to improve the mounting performance of the sealing loop 15 in the first groove 123, referring to FIG. 8, the first groove 123 is provided with anti-slip ribs 125 at a bottom wall thereof, and the anti-slip ribs 125 are ribs axially distributed along the guiding sleeve 12. The overmolded rubber loop can form a shape adapted to the anti-slip rib 125, which can effectively enhance the stability of the rubber loop in the first groove 123, so that the pipe stock 13 pressed against the rubber loop can be better sealed.

Moreover, referring to FIG. 7 and FIG. 8, the outer wall of the guiding sleeve 12 is provided with an inclined protrusion 126, the first groove 123 is located between the second groove 124 and the inclined protrusion 126. A thickness of the inclined protrusion 126 gradually decreases along a direction away from the first concave-convex structure 121, and an inner wall of the pipe stock 13 sleeved on the guiding sleeve 12 can be pressed against the inclined protrusion 126. During use, when the pipe stock 13 is inserted into the guiding sleeve 12, the pipe stock 13 is gradually pressed against the inclined protrusion 126 as the insertion depth increases. The pipe stock 13 is pressed tighter on the inclined protrusion 126 as the thickness of the inclined protrusion 126 increases, so that the pipe stock 13 can be inserted more reliably onto the guiding sleeve 12 and a fixed connection between the pipe stock 13 and the guiding sleeve 12 is achieved.

Figure 10:
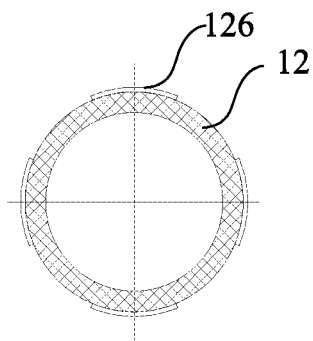
FIG. 10 is a cross-sectional view of FIG. 8 taken along a direction of F-F.

Specifically, the number of the inclined protrusions 126 is not limited as long as the pipe stock 13 can be inserted more reliably onto the guiding sleeve 12. There may be a plurality of inclined protrusions 126, or referring to FIG. 10, four inclined protrusions 126 are disposed on the outer wall of the guiding sleeve 12, and the four inclined protrusions 126 are evenly spaced. With such a configuration, when the pipe stock 13 is inserted onto the guiding sleeve 12, the pressing and offset in all directions are the same. The pipe stock 13 is always coaxial with the guiding sleeve 12, thereby further increasing the sealing between the pipe stock 13 and the rubber loop, while ensuring the coaxiality of the pipe stock 13 with the guiding sleeve 12 and the connecting body 11, thereby improving the stability of the flow of the liquid in the pipe stock 13 between the guiding sleeve 12 and the connecting body 11.

Furthermore, referring to FIG. 1 and FIG. 5, the pipe joint assembly 10 further includes a second sealing ring 16. The inner wall of the connecting body 11 is provided with a mounting position 113 configured to position the second sealing ring 16, and the second sealing ring 16 can be pressed between the connecting body 11 and the pipe stock 13. The second sealing ring 16 is positioned between the connecting body 11 and the pipe stock 13 by providing the mounting position 113 of the second sealing ring 16 on the inner wall of the connecting body 11, so that the seal between the connecting body 11 and the pipe stock 13 is achieved, thereby further improving the sealing performance of the pipe joint assembly 10. The liquid flowing from the connecting body 11 into the pipe stock 13 may be prevented from overflowing between the connecting body 11 and the guiding sleeve 12 by the first sealing ring 14, while the liquid that is not successfully blocked by the first sealing ring 14 will be further prevented from overflowing out of the pipe stock 13 assembly under the effect of the sealing loop 15 and the second sealing ring 16. A plurality of seals are formed by the cooperation of the first sealing ring 14, the second sealing ring 16, and the sealing loop 15, thereby improving the sealing reliability of the pipe joint assembly 10.

Furthermore, in order to prevent the pipe stock 13 inserted into the connecting body 11 from falling off, referring to FIG. 1 and FIG. 11, the pipe joint assembly 10 is further provided with a cushion 115, an internal teeth washer 116, and a housing sleeved on the outer wall of the connecting body 11. The cushion 115 and the internal teeth washer 116 are sequentially laminated at an end portion of the connecting body 11. The connecting body 11 is provided with a flange 114 at the outer wall thereof. The housing 17 is provided with a fastening groove 171 at an inner wall thereof, and one side wall of the fastening groove 171 is pressed against the internal teeth washer 116, and the other side wall of the fastening groove 171 is hooked on the flange 114. The teeth 1161 of the internal teeth washer 116 can be pressed against an outer wall of the pipe stock 13.

Figure 12:
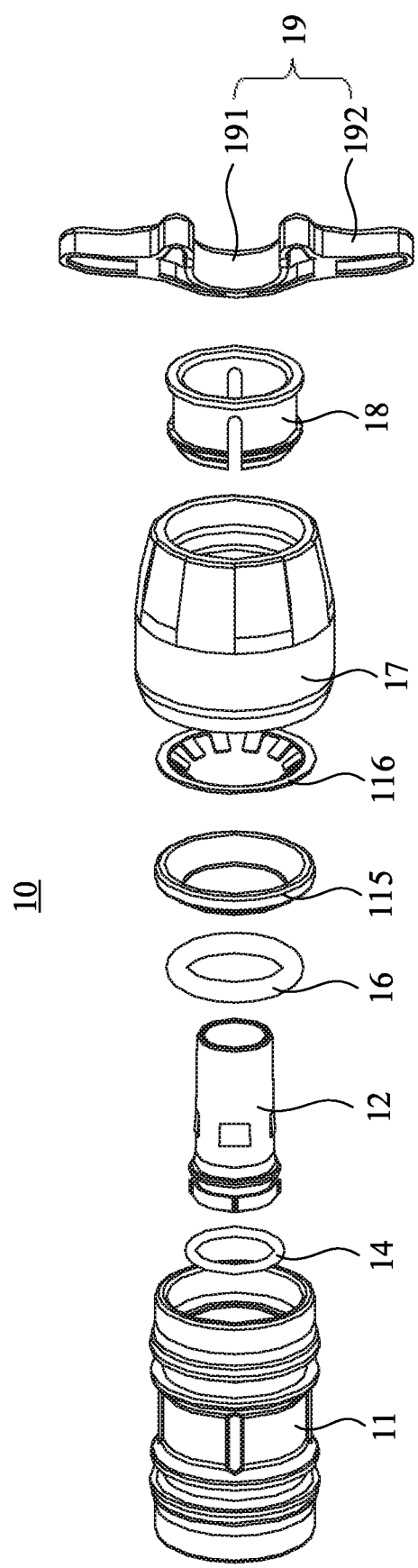
FIG. 12 is an exploded view of the pipe joint assembly according to the embodiment.

During use, referring to FIG. 12, the sealing loop 15 is first disposed in the first groove 123 by means of overmolding, and the first sealing ring 14 is mounted in the second groove 124. The pipe stock 13 is then inserted onto the guiding sleeve 12, and as the overlapping length between the pipe stock 13 and the guiding sleeve 12 increases, the inner wall of the pipe stock 13 is gradually tensioned under the effect of the inclined protrusion 126 until the end portion of the pipe stock 13 inserted onto the guiding sleeve 12 is pressed against the sealing loop 15, so that a secure mounting between the pipe stock 13 and the guiding sleeve 12 is achieved. Then, the second sealing ring 16 is mounted on the mounting position 113 of the connecting body 11, and the cushion 115 and the internal teeth washer 116 are sequentially laminated on the end portion of the connecting body 11, and then the cushion 115 and the internal teeth washer 116 are fixed to the end portion of the connecting body 11 by using the fastening groove 171 provided in the inner wall of the housing 17. Finally, the guiding sleeve 12 to which the pipe stock 13 is connected is inserted into the connecting body 11 from outside to inside sequentially through the internal teeth washer 116, the cushion 115, and the second sealing ring 16 until the first concave-convex structure 121 on the guiding sleeve 12 is matched with the second concave-convex structure 111 on the connecting body 11, thereby achieving the interference fit. In addition, by rotating the pipe stock 13 or the connecting body 11, the first concave-convex structure 121 and the second concave-convex structure 111 will generate the frictional sound. At this time, the pipe stock 13 is mounted in position, and the teeth 1161 of the internal teeth washer 116 are pressed against the outer wall of the pipe stock 13, so that the pipe stock 13 is prevented from being withdrawn from the inside of the connecting body 11, and the reliability of the mounting and connection of the pipe stock 13 within the pipe joint assembly 10 is improved. Moreover, by reasonably designing the axial width of the inner wall of the connecting body 11 that is in close contact with the first sealing ring 14, so that when the pipe stock 13 pressed against by the teeth 1161 has a backward movement within a normal range, the first sealing ring 14 can always achieve the seal between the connecting body 11 and the guiding sleeve 12, further improving the reliability of the mounting and use of the pipe stock 13 within the pipe joint assembly 10.

In addition, referring to FIG. 11 and FIG. 12, the pipe joint assembly 10 further includes a pressing sleeve 18 and a pipe acquiring pressing member 19. The pressing sleeve 18 is inserted into the housing 17, and the pressing sleeve 18 is hooked on the inner wall of the housing 17. A front end portion 181 of the pressing sleeve 18 abuts against the teeth 1161 of the internal teeth washer 116. The pipe acquiring pressing member 19 includes an elastic bending portion 191 and pressing portions 192 located at both ends of the elastic bending portion 191. The elastic bending portion 191 is provided with a bump 193 at a side wall thereof. The pipe acquiring pressing member 19 is pressed in a direction proximal to the pressing sleeve 18 by controlling the pressing portion 192, so that the bump 193 presses upwardly a rear end portion 182 of the pressing sleeve 18, and the front end portion 181 of the pressing sleeve 18 is moved to open the teeth 1161 of the internal teeth washer 116.

The pipe stock 13 inserted in position cannot be withdrawn from the pipe joint assembly 10 by the effect of the internal teeth washer 116. When the pipe stock 13 assembly needs to be taken out, the rear end portion 182 of the pressing sleeve 18 can be pressed against by the bump 193 of the pipe acquiring pressing member 19, so that the pressing sleeve 18 moves towards the connecting body 11, the front end portion 181 of the pressing sleeve 18 is moved to open the teeth 1161 capable of abutting against therewith. Therefore, the teeth 1161 release the pipe stock 13, and then the pipe stock 13 is taken out, so that the quick disassembly and replacement of the pipe stock 13 can be achieved. The disassembly of the pipe stock 13 does not need to be achieved by damaging the pipe stock 13, so that the pipe stock 13 can be reused, saving costs and avoiding unnecessary waste.

The pipe joint assembly 10 provided above achieves the determination of whether the pipe stock 13 is mounted in position by the cooperation of the first concave-convex structure 121 and the second concave-convex structure 111 provided. During mounting, the first concave-convex structure 121 is in interference fit with the second concave-convex structure 111 when the pipe stock 13 is mounted in position, and when the connecting body 11 and the guiding sleeve 12 are relatively rotated, the first concave-convex structure 121 and the second concave-convex structure 111 will generate the friction sound, and in this manner, whether the pipe stock 13 is mounted in position is determined. Without relying on the material of the pipe joint assembly 10 and without requiring complex manufacturing processes to achieve, the market competitiveness of the pipe joint assembly 10 is enhanced.

Figure 13:
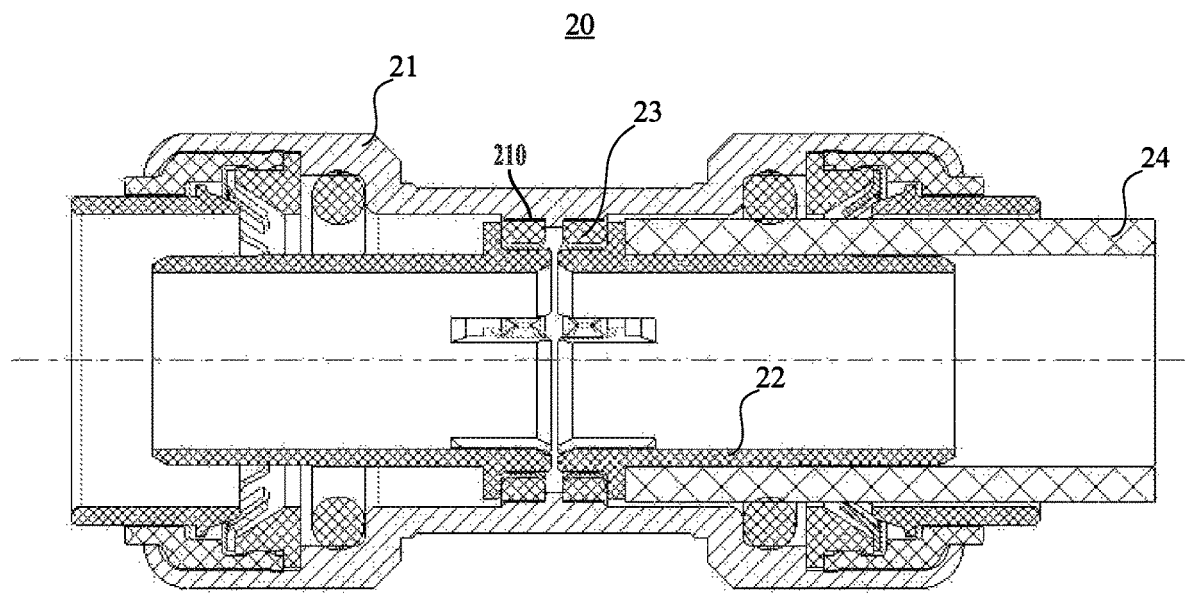
FIG. 13 is a cross-sectional view of a pipe joint assembly in accordance with another embodiment of the present disclosure.
Figure 14:
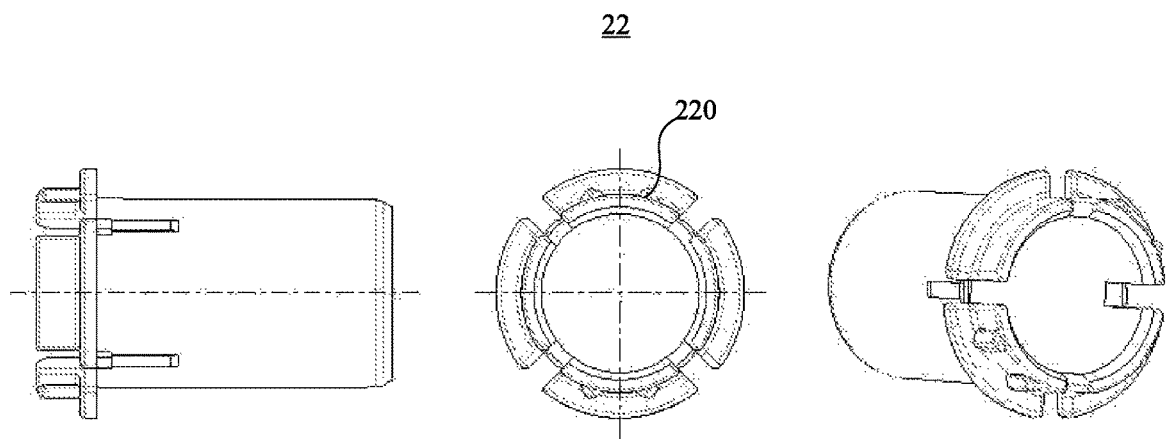
FIG. 14 is a schematic view of an inner ring gear of the pipe joint assembly in accordance with another embodiment of the present disclosure.
Figure 15:
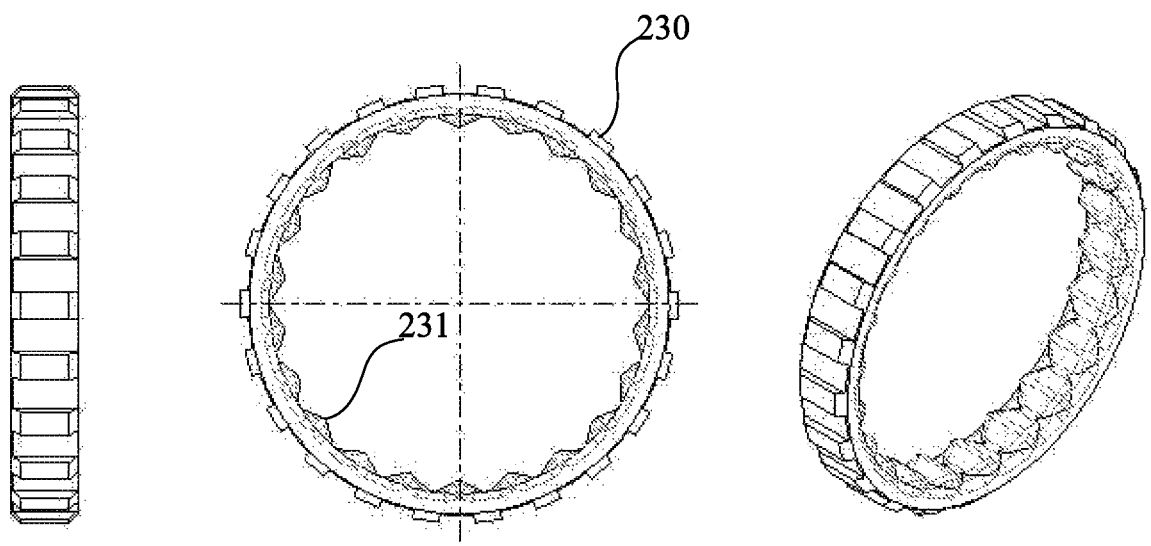
FIG. 15 is a schematic view of a guiding sleeve of the pipe joint assembly in accordance with another embodiment of the present disclosure.
Figure 16:
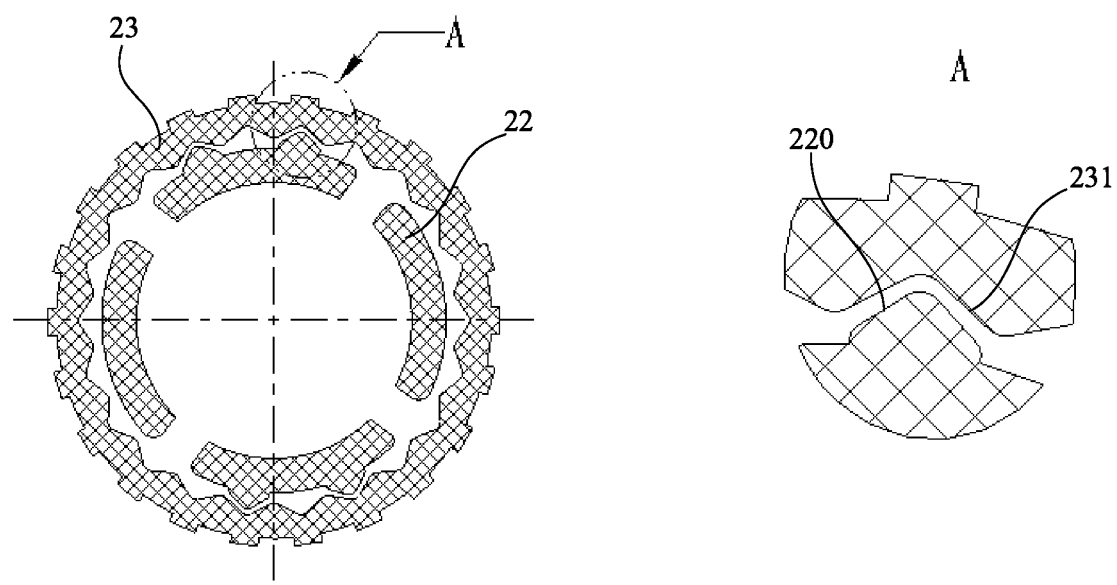
FIG. 16 is a schematic cross-sectional view of the inner ring gear and the guiding sleeve of the pipe joint assembly in an assembled state, and a partial enlarged view of a position A, in accordance with another embodiment of the present disclosure.

FIG. 13 and FIG. 16 illustrate another embodiment of the present disclosure. Referring to FIG. 13, a pipe joint assembly 20 includes: a guiding sleeve 22, one end of which is inserted into a pipe stock 24; a connecting body 21, an inner wall of which is provided with a second concave-convex structure, and in the present embodiment, the second concave-convex structure is wavy tines 210; and an inner ring gear 23. The inner ring gear 23 is concentrically inserted into the connecting body 21. The other end of the guiding sleeve 22 is concentrically inserted into the connecting body 21 while being inserted concentrically into the inner ring gear 23. Referring to FIG. 14, the end of the guiding sleeve 22 which is inserted into the connecting body 21 is provided with a first concave-convex structure. In the present embodiment, the first concave-convex structure is a pointed paddle 220. Referring to FIG. 15, an inner ring of the inner ring gear 23 is provided with a third concave-convex structure, and an outer ring of the inner ring gear is provided with a fourth concave-convex structure. In the present embodiment, the third concave-convex structure is wavy tines 231, and the fourth concave-convex structure is ridges 230.

When the pipe joint assembly 20 is assembled, both ends of the connecting body 21 can receive the guiding sleeve 22 and the inner ring gear 23. The inner ring gear 23 is concentrically inserted into the connecting body 21, and the ridges 230 are in interference fit with the wavy tines 210, so that the inner ring gear 23 is firmly latched to the inner wall of the connecting body 21. It should be understood that the ridges 230 and the wavy tines 210 are exemplary in the present embodiment. The second concave-convex structure and the fourth concave-convex structure may be pointed paddles, wavy tines, ridges, and any other suitable structures. The second concave-convex structure and the fourth concave-convex structure may be the same structure or different structures, and only the requirement that the second concave-convex structure and the fourth concave-convex structure can be connected to each other by the interference fit is required to be satisfied. The guiding sleeve is concentrically inserted into the connecting body 21 and inserted into the inner ring gear 23, and the pointed paddles 220 are in clearance fit with the wavy tines 231 in a manner of movement interference. When the guiding sleeve 22 rotates relative to the inner ring gear 23, the pointed paddles 220 and the wavy tines 231 generate a frictional sound and a vibration due to the presence of movement interference, prompting the user that the pipe stock has been inserted in position. It should be understood that both the pointed paddles 220 and the wavy tines 231 are exemplary in the present embodiment. The first concave-convex structure and the third concave-convex structure may be pointed paddles, wavy tines, ridges, and any other suitable structures. The first concave-convex structure and the third concave-convex structure may be the same structure or different structures, and only the requirement that the first concave-convex structure can be in clearance fit with the third concave-convex structure in a manner of movement interference is required to be satisfied.

Other structural features of the pipe joint assembly 20 are the same as that of the pipe joint assembly 10 and therefore will not be described again. Although the respective embodiments have been described one by one, it shall be appreciated that the respective embodiments will not be isolated. Those skilled in the art can apparently appreciate upon reading the disclosure of this application that the respective technical features involved in the respective embodiments can be combined arbitrarily between the respective embodiments as long as they have no collision with each other. Of course, the respective technical features mentioned in the same embodiment can also be combined arbitrarily as long as they have no collision with each other.

Although the disclosure is illustrated and described herein with reference to specific embodiments, the disclosure is not intended to be limited to the details shown. Rather, various modifications may be made in the details within the scope and range of equivalents of the claims and without departing from the disclosure.

What is claimed is:

1. A pipe joint assembly, comprising:
    a connecting body having opposing first and second connecting body ends; and
    a guiding sleeve insertable into one of the first and second connecting body ends and including first and second opposing guiding sleeve ends, wherein one of the first and second guiding sleeve ends is insertable into a pipe stock, and an outer wall of the other of the first and second guiding sleeve ends is provided with a first concave-convex structure,
    wherein an inner wall of the connecting body is provided with a second concave-convex structure corresponding with the first concave-convex structure and in an interference fit with the first concave-convex structure when the pipe stock is sleeved on the guiding sleeve and is inserted into the connecting body, and
    wherein the first concave-convex structure and the second concave-convex structure generate a frictional sound and a vibration when the guiding sleeve rotates relative to the connecting body.

2. The pipe joint assembly according to claim 1, wherein the first concave-convex structure includes a pointed paddle, and the second concave-convex structure includes wavy tines distributed circumferentially along the inner wall of the connecting body.

3. The pipe joint assembly according to claim 2, wherein the paddle includes a plurality of pointed paddles, and each of the pointed paddles is circumferentially spaced apart at the outer wall of the guiding sleeve.

4. The pipe joint assembly according to claim 1, wherein the second concave-convex structure includes a plurality of second concave-convex structures, wherein an end of a cannula of the connecting body is axially distributed with the second concave-convex structures, and the second concave-convex structures are directly disposed on the connecting body or fixed on the connecting body in an inlaid manner.

5. The pipe joint assembly according to claim 1, further comprising:
    a first sealing ring; and
    a sealing loop,
    wherein the outer wall of the guiding sleeve includes first and second grooves, and the second groove is disposed between the first groove and the first concave-convex structure,
    wherein the first sealing ring engages the second groove to achieve a seal between the outer wall of the guiding sleeve and the inner wall of the connecting body, and
    wherein the sealing loop is a rubber loop overmolded in the first groove to achieve a seal between an inner wall of the pipe stock and the outer wall of the guiding sleeve.

6. The pipe joint assembly according to claim 5, wherein the first groove includes anti-slip ribs axially distributed along the guiding sleeve.

7. The pipe joint assembly according to claim 5, wherein the guiding sleeve includes an inclined protrusion disposed on the outer wall, the first groove is located between the second groove and the inclined protrusion, a thickness of the inclined protrusion gradually decreases along a direction away from the first concave-convex structure, and an inner wall of the pipe stock presses against the inclined protrusion when the pipe stock is sleeved on the guiding sleeve.

8. The pipe joint assembly according to claim 5, further comprising a second sealing ring, wherein the inner wall of the connecting body is provided with a mounting position configured to position the second sealing ring, and the second sealing ring is adapted to be pressed between the connecting body and the pipe stock.

9. The pipe joint assembly according to claim 1, further comprising:
    a cushion;
    an internal teeth washer; and
    a housing sleeved on the outer wall of the connecting body,
    wherein the cushion and the internal teeth washer are sequentially laminated proximate the first and second connecting body ends, the connecting body includes a flange on the outer wall thereof, and the housing includes a fastening groove at an inner wall thereof,
    wherein the fastening groove includes first and second sidewalls, one of the first and second side walls presses against the internal teeth washer, and another of the first and second side walls is hooked on the flange, and
    wherein teeth of the internal teeth washer are adapted to press against an outer wall of the pipe stock.

10. The pipe joint assembly according to claim 9, further comprising:
    a pressing sleeve having first and second opposing pressing sleeve ends; and
    a pipe acquiring pressing member having an elastic bending portion and pressing portions located at both ends of the elastic bending portion,
    wherein the pressing sleeve is hooked on the inner wall of the housing, and one of the first and second pressing sleeve ends is adapted to abut against the teeth of the internal teeth washer;
    wherein the elastic bending portion includes a bump at a side wall thereof; and
    wherein the pipe acquiring pressing member is pressed in a direction proximal to the pressing sleeve by controlling the pressing portion, so that the bump presses upwardly towards another of the first and second pressing sleeve ends, and the one of the first and second pressing sleeve ends is moved to open the teeth of the internal teeth washer.

11. A pipe joint assembly, comprising:
    a guiding sleeve having first and second guiding sleeve ends, wherein one of the first and second guiding sleeve ends is insertable into a pipe stock, and another of the first and second guiding sleeve ends includes an outer wall provided with a first concave-convex structure;
    a connecting body having first and second connecting body ends, wherein each of the first and second connecting body ends includes an inner wall provided with a second concave-convex structure;

an inner ring gear having inner and outer rings, wherein the inner ring includes a third concave-convex structure, and the outer ring includes a fourth concave-convex structure;

wherein the first and second connecting body ends are adapted to receive the guiding sleeve and the inner ring gear, the inner ring gear is concentrically inserted into the connecting body, and the fourth concave-convex structure is in an interference fit with the second concave-convex structure;

wherein the guiding sleeve is simultaneously concentrically inserted into the connecting body and the inner ring gear, and the first concave-convex structure is in clearance fit with the fourth concave-convex structure in a manner of movement interference; and wherein when the guiding sleeve rotates relative to the inner ring gear, the first concave-convex structure and the third concave-convex structure generate a frictional sound and a vibration.

12. The pipe joint assembly according to claim 11, wherein the first concave-convex structure includes a pointed paddle, the second concave-convex structure includes wavy tines distributed circumferentially along the inner wall of the connecting body, the third concave-convex structure includes wavy tines distributed circumferentially along an inner wall of the inner ring gear, and the fourth concave-convex structure includes a ridge.

13. The pipe joint assembly according to claim 12, wherein the pointed paddle includes a plurality of pointed paddles, and each of the pointed paddles is circumferentially spaced apart at the outer wall of the guiding sleeve.

14. The pipe joint assembly according to claim 12, wherein the ridge includes a plurality of ridges, and each of the ridges is circumferentially spaced apart at the outer ring and corresponds to a gap of the wavy tines on the inner ring.

15. The pipe joint assembly according to claim 11, wherein the second concave-convex structure includes a plurality of second concave-convex structures, wherein an end of a cannula of the connecting body is axially distributed with the second concave-convex structures, and wherein the second concave-convex structures are directly disposed on the connecting body or fixed on the connecting body in an inlaid manner.

16. The pipe joint assembly according to claim 11, further comprising:
  a first sealing ring; and
  a sealing loop;
  wherein the outer wall of the guiding sleeve includes first and second grooves, and the second groove is disposed between the first groove and the first concave-convex structure;
  wherein the first sealing ring engages with the second groove to achieve a seal between the outer wall of the guiding sleeve and the inner wall of the connecting body; and
  wherein the sealing loop is a rubber loop overmolded in the first groove to achieve a seal between an inner wall of the pipe stock and the outer wall of the guiding sleeve.

17. The pipe joint assembly according to claim 16, wherein the guiding sleeve includes an inclined protrusion at the outer wall thereof, the first groove is located between the second groove and the inclined protrusion, a thickness of the inclined protrusion gradually decreases along a direction away from the first concave-convex structure, and an inner wall of the pipe stock is adapted to press against the inclined protrusion.

18. The pipe joint assembly according to claim 16, further comprising a second sealing ring, wherein the inner wall of the connecting body includes a mounting position adapted to position the second sealing ring, and the second sealing ring is disposed between the connecting body and the pipe stock.

19. The pipe joint assembly according to claim 11, further comprising:
  a cushion;
  an internal teeth washer; and
  a housing sleeved on the outer wall of the connecting body;
  wherein the cushion and the internal teeth washer are sequentially laminated proximate the first and second connecting body ends, the connecting body includes a flange at the outer wall thereof, and the housing includes a fastening groove at an inner wall thereof that includes first and second side walls;
  wherein one of the first and second side walls is pressed against the internal teeth washer, and another of the first and second side walls is hooked on the flange; and
  wherein teeth of the internal teeth washer are adapted to press against an outer wall of the pipe stock.

20. The pipe joint assembly according to claim 19, further comprising:
  a pressing sleeve having first and second opposing pressing sleeve ends; and
  a pipe acquiring pressing member having an elastic bending portion and pressing portions located at both ends of the elastic bending portion,
  wherein the pressing sleeve is hooked on the inner wall of the housing, and one of the first and second pressing sleeve ends is adapted to abut against the teeth of the internal teeth washer;
  wherein the elastic bending portion includes a bump at a side wall thereof; and
  wherein the pipe acquiring pressing member is pressed in a direction proximal to the pressing sleeve by controlling the pressing portion, so that the bump presses upwardly towards another of the first and second pressing sleeve ends, and the one of the first and second pressing sleeve ends is moved to open the teeth of the internal teeth washer.

* * * * *